US011859493B2

(12) United States Patent
Yu et al.

(10) Patent No.: US 11,859,493 B2
(45) Date of Patent: Jan. 2, 2024

(54) DEVICE FOR MONITORING HORIZONTAL EXTRUSION FORCE OF ROOF ROCK STRATA AND METHOD USING THE SAME

(71) Applicant: SHANDONG UNIVERSITY OF SCIENCE AND TECHNOLOGY, Qingdao (CN)

(72) Inventors: Fenghai Yu, Qingdao (CN); Kai Zhou, Qingdao (CN); Yunliang Tan, Qingdao (CN); Xuepeng Gao, Qingdao (CN); Wei Zhao, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 506 days.

(21) Appl. No.: 17/269,557

(22) PCT Filed: May 14, 2019

(86) PCT No.: PCT/CN2019/086732
§ 371 (c)(1),
(2) Date: Feb. 19, 2021

(87) PCT Pub. No.: WO2020/119018
PCT Pub. Date: Jun. 18, 2020

(65) Prior Publication Data
US 2021/0332701 A1    Oct. 28, 2021

(30) Foreign Application Priority Data
Dec. 14, 2018    (CN) .......................... 201811530065.1

(51) Int. Cl.
*G01L 1/02*    (2006.01)
*E21D 9/00*    (2006.01)
*E21D 20/00*    (2006.01)

(52) U.S. Cl.
CPC ................ *E21D 9/003* (2013.01); *G01L 1/02* (2013.01); *E21D 20/00* (2013.01)

(58) Field of Classification Search
CPC . E21D 9/003; E21D 20/00; G01L 1/02; E21F 17/185
See application file for complete search history.

(56) References Cited

U.S. PATENT DOCUMENTS 9,417,153 B2 *    8/2016    Parker ..................... G01M 3/20
9,869,603 B2 *    1/2018    Parker ................... G01M 3/022
(Continued)

FOREIGN PATENT DOCUMENTS

CN    109372581 A    2/2019
CN    109630201 A    4/2019

OTHER PUBLICATIONS

International Search Report issued in corresponding International Application No. PCT/CN2019/086732; dated Jul. 29, 2019; State Intellectual Property Office of the P.R. China, Beijing, China, 8 pgs.
(Continued)

*Primary Examiner* — Freddie Kirkland, III
(74) *Attorney, Agent, or Firm* — HAUPTMAN HAM, LLP

(57) ABSTRACT

A device includes a pressure measuring segment, a connecting rod, a hydraulic pump, a pressure gauge, a high-pressure oil pipe, a pressure control valve, a tray, a push rod and a connection casing. The pressure measuring segment is on the connecting rod, a front end of the push rod is connected with the connecting rod, the tray is at a rear end of the push rod, the connection casing is connected with the tray. The pressure measuring segment includes a main pipe, a hydraulic bladder, a fixing ring, a barrier sheet, an outer pillow housing and a connection sleeve. Both ends of the hydraulic bladder are sleeved on the main pipe, an oil inlet is in communication with the hydraulic bladder, the outer pillow
(Continued)

housing is sleeved on the main pipe, the connection sleeve is wrapped around the outer pillow housing.

9 Claims, 5 Drawing Sheets

(56) References Cited

U.S. PATENT DOCUMENTS

| | | | |
|---|---|---|---|
| 10,082,433 B2 * | 9/2018 | Wang | E21C 39/00 |
| 11,067,392 B2 * | 7/2021 | Tan | E21D 21/0093 |
| 2017/0122822 A1 * | 5/2017 | Wang | E21F 17/18 |

OTHER PUBLICATIONS

Written Opinion issued in corresponding International Application No. PCT/CN2019/086732; dated Jul. 29, 2019; State Intellectual Property Office of the P.R. China, Beijing, China, 8 pgs.

* cited by examiner

DEVICE FOR MONITORING HORIZONTAL EXTRUSION FORCE OF ROOF ROCK STRATA AND METHOD USING THE SAME

RELATED APPLICATIONS

The present application is a U.S. National Phase of International Application Number PCT/CN2019/086732, filed May 14, 2019, and claims the priority of Chinese Application No. 201811530065.1, filed Dec. 14, 2018.

TECHNICAL FIELD

The present disclosure relates to the technical field of pressure monitoring, and in particular to a device for monitoring a horizontal extrusion force of roof rock strata and a method using the device.

BACKGROUND

In a large number of coal roadways excavated annually in China, bolt-supported roadways account for 80% or more of the coal roadways. To ensure safety of bolt supporting, bolt supporting parameters are to be determined reasonably. An anchoring segment of an anchor bolt disposed at a location with the largest horizontal pressure may increase a bonding force between the anchor bolt and an anchoring agent so as to enhance an anchoring effect. Thus, it is required to firstly measure a horizontal stress in order to determine the location of the anchoring segment reasonably and improve the supporting effect of the anchor bolt. A method of testing a stress of an underground surrounding rock in a coal mine mainly includes a hydraulic fracturing method and a sleeve fracturing method. In the hydraulic fracturing method, a fracturing point is closed at a designated location by using a water-stop packer, the stress of the surrounding rock is measured by fracturing a hole wall by performing pressurization using a hydraulic pump. In this method, a test instrument is relatively bulky and not well applicable to the more broken surrounding rocks. In the sleeve fracturing method, a borehole is fractured by pressurizing a rubber sleeve to obtain the stresses of the surrounding rocks sequentially. However, calculation is required after the test is completed. A used geostress test instrument cannot directly reflect the stress of the surrounding rock, leading to a less intuitive result. The stress of the surrounding rock may also be measured by an instrument such as a borehole stress meter. A multi-point stress meter disclosed in Chinese patent CN 203669931 U may realize real-time testing of multi-point stresses. However, it is difficult to push and fix a monitoring device for monitoring a roof stress.

To measure the horizontal stress of the roof accurately, determine the stress of the surrounding rock accurately and conveniently and further provide a basis for design of the anchor bolt, it is required to further improve the existing device and method for monitoring a horizontal extrusion force.

SUMMARY

To solve the technical problem of a difficulty in monitoring the horizontal extrusion force of the surrounding rock of the roadway roof, the present disclosure provides a device for monitoring a horizontal extrusion force of roof rock strata and a method using the same. A specific technical solution is described below.

A device for monitoring a horizontal extrusion force of roof rock strata includes a pressure measuring segment, a connecting rod, a hydraulic pump, a pressure gauge, a high-pressure oil pipe, a pressure control valve, a tray, a push rod and a connection casing; the connecting rod is connected with the pressure measuring segment, a front end of the push rod is connected with the connecting rod, a rear end of the push rod passes through the tray, and the connection casing is connected with the tray; the high-pressure oil pipe is connected with the hydraulic pump and protrudes to the pressure measuring segment through inner cavities of the push rod and the connecting rod; the pressure measuring segment includes a main pipe, a hydraulic bladder, a fixing ring, a barrier sheet, an outer pillow housing and a connection sleeve; both ends of the hydraulic bladder are sleeved on the main pipe by the fixing rings, and an oil inlet is disposed on the main pipe to be in communication with the hydraulic bladder; the outer pillow housing is sleeved on the main pipe, the connection sleeve is wrapped around an outer side of the outer pillow housing, and the barrier sheet is disposed between the fixing ring and the outer pillow housing.

Preferably, each high-pressure oil pipe is divided into a plurality of segments and the high pressure oil pipes are connected by oil pipe joints, where one segment is connected on the hydraulic pump, one segment is disposed in the inner cavities of the push rod and the connecting rod, and another segment is disposed in the pressure measuring segment; the oil pipe joints are disposed in the connection casing; the pressure control valve and the pressure gauge are also disposed on the high-pressure oil pipe connected on the hydraulic pump.

Preferably, two or more pressure measuring segments are connected with the connecting rod, and one communicating high-pressure oil pipe is disposed for each pressure measuring segment; a design length margin of the high-pressure oil pipe is placed in the connection casing.

Preferably, the high-pressure oil pipe and the oil inlet on the main pipe are connected by the oil pipe joint, internal threads are disposed at inner sides of pipe walls at both ends of the main pipe respectively to be mated with an external thread of the connecting rod, and external threads are disposed at outer sides of pipe walls at both ends of the main pipe respectively to be mated with internal threads of the barrier sheets.

Preferably, the outer pillow housing is divided into four parts of same shape, and a combination body of the outer pillow housing is a cylindrical housing; the outer pillow housing is sleeved on the main pipe in a combination manner when the hydraulic bladder contracts, and expands in four parts when the hydraulic bladder is liquid-filled to expand.

Preferably, both ends of the connection sleeve are closely attached to the main pipe, and the connection sleeve tightly presses both ends of the outer pillow housing to be in contact with the main pipe.

Preferably, a through-hole is disposed on the tray, and the connecting rod passes through the through-hole of the tray; the connection casing is connected with an external thread at a protrusion of the tray; the push rod pushes the connecting rod and the pressure measuring segment by the connection casing.

Preferably, the main pipe and the push rod are made of a steel material, and the hydraulic bladder and the connection sleeve are made of a flexible rubber material; the pressure gauge is a digital pressure gauge; the hydraulic pump is a high-pressure pump.

A method using the above device for monitoring a horizontal extrusion force of roof rock strata includes the following steps.

At step a, the connecting rod is connected with the pressure measuring segment, the high-pressure oil pipes in the inner cavities of the connecting rod and the pressure measuring segment are connected by oil pipe joints, the tray is fixed, and the connection casing is mounted.

At step b, the push rod pushes the connecting rod and the pressure measuring segment into a borehole, and the connection casing and the push rod are dismounted after the tray and the roof are fixed.

At step c, the exposed high-pressure oil pipes are connected to the hydraulic pump, the pressure control valve and the pressure gauge.

At step d, a switch on the pressure control valve is turned on to perform pressurization by injecting oil using the hydraulic pump, and the pressurization is stopped after a reading of the pressure gauge reaches 5-6 MPa, so that hydraulic oil flows back; air in the high-pressure oil pipe is emptied by repeating this step 2-5 times.

At step e, pressurization is performed by injecting oil using the hydraulic pump, and the pressure control valve is closed after the reading of the pressure gauge reaches 5-6 MPa.

At step f, pressurization is performed for a plurality of pressure measuring segments respectively through hydraulic oil injection by repeating steps d and e.

At step g, the hydraulic pump is dismounted, and monitoring data of the pressure gauge is monitored and stored.

At step h, the pressure control valve is opened to discharge the hydraulic oil; the connection casing and the push rod are connected to take out the connecting rod and the pressure measuring segment from the borehole by the connected push rod.

The present disclosure has the following beneficial effects.

(1) The device for monitoring a horizontal extrusion force of roof rock strata according to the present disclosure performs monitoring of the horizontal extrusion force for points in the borehole by disposing the hydraulic pump and the pressure measuring segment so as to monitor the horizontal extrusion forces of several borehole depths by disposing one borehole without mutual interference among monitorings of different pressure measuring segments; the high-pressure oil pipes are disposed in the inner cavities of the push rod and the connecting rod to protect the safety of the high-pressure oil pipes; further, the monitoring device is convenient to dismount and reusable.

(2) The pressure measuring segment adopts a combination-type outer pillow housing to better contact with the surrounding rock in the borehole, so as to obtain more accurate pressure measurement; with the use of a combination of the push rod and the connecting rod, the device is conveniently used in different depths of boreholes, and the monitoring scope is expanded by using the combination of the push rod and the connecting rod with different lengths; the barrier sheet is disposed between the fixing ring and the outer pillow housing, and the barrier sheets at both sides effectively prevent expansion of the hydraulic bladder along a direction of the main pipe, thereby ensuring monitoring accuracy.

(3) When the device performs monitoring, the horizontal extrusion force of the roof may be determined by only recording the reading of the pressure gauge, and monitored effectively for long; the tray disposed can support the structure in the borehole after the connecting rod and the pressure measuring segment are pushed in; the connection casing is used to receive the length margin of the high-pressure oil pipe, thereby ensuring more convenient extension and retraction.

In addition, the present disclosure is of a simple structure, convenient to carry and use, economical and durable, and the like.

Numerals of the drawings are described as follows: 1—pressure measuring segment; 11—main pipe; 11—oil inlet; 112—external thread; 113—internal thread; 12—hydraulic bladder; 13—fixing ring; 14—barrier sheet; 15—outer pillow housing; 16—connection sleeve; 2—connecting rod; 3—hydraulic pump; 4—pressure gauge; 5—high-pressure oil pipe; 6—pressure control valve; 7—tray; 8—push rod; and 9—connection casing.

DETAILED DESCRIPTION OF THE EMBODIMENTS

As shown in FIGS. 1-11, the present disclosure provides a device for monitoring a horizontal extrusion force of roof rock strata and a method using the same. Specific examples are described below.

Figure 1:
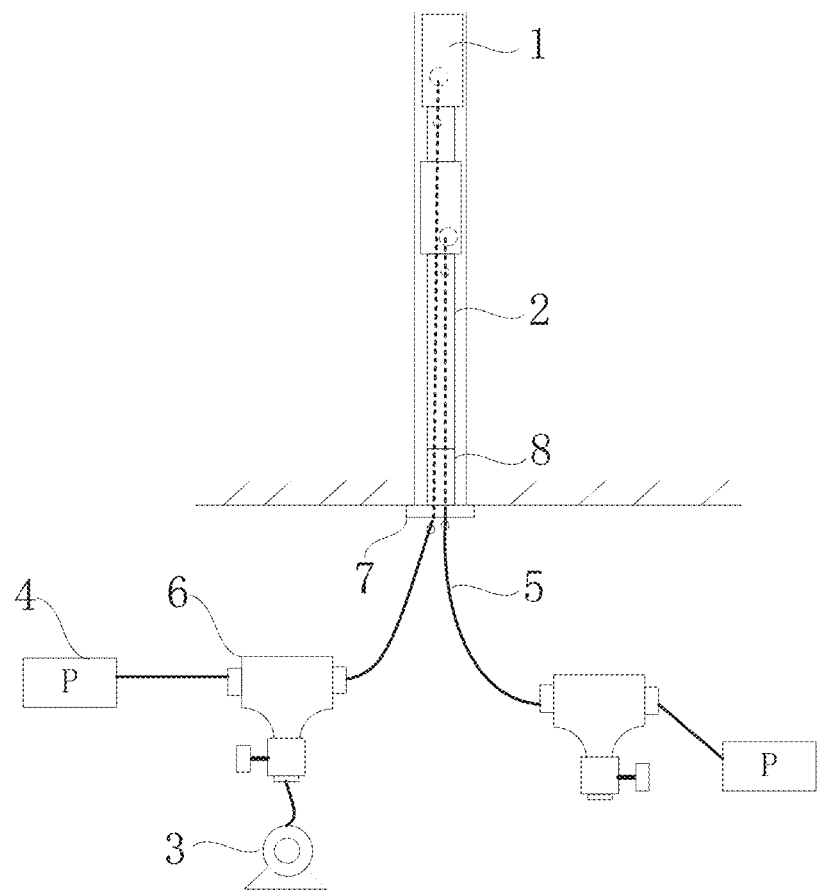
FIG. 1 is a structural schematic diagram illustrating a device for monitoring a horizontal extrusion force of roof rock strata according to an example of the present disclosure.

Specifically, a device for monitoring a horizontal extrusion force of roof rock strata includes a pressure measuring segment 1, a connecting rod 2, a hydraulic pump 3, a pressure gauge 4, a high-pressure oil pipe 5, a pressure control valve 6, a tray 7, a push rod 8 and a connection casing 9, as shown in FIG. 1. The connecting rod 2 is thread-connected with the pressure measuring segment 1, a front end of the push rod 8 is connected with the connecting rod 2, the tray 7 is disposed at a rear end of the push rod 8, the connection casing 9 is connected with the tray 7, and the high-pressure oil pipe 5 is connected with the hydraulic pump 3 and protrudes to the pressure measuring segment 1 through inner cavities of the push rod 8 and the connecting rod 2. The combination of the connecting rod 2 and the pressure measuring segment 1 facilitates monitoring the horizontal extraction forces at different depths, the push rod 8 ensures that the device can perform deep-hole monitoring, the tray 7 and the connection casing 9 facilitate fixing the device and placing the high-pressure oil pipe 5 in the borehole, the combination of the hydraulic pump 3 and the pressure gauge 4 facilitates real-time monitoring, and the hydraulic pump 3, the pressure gauge 4 and the pressure control valve 6 may realize long-time monitoring of the horizontal extrusion force. By using the device, a plurality of pressure measuring segments may be disposed, and the connecting rods with an appropriate length may be selected according to the location of the monitoring point, so that each connected pressure measuring segment is disposed at the designated monitoring point, producing high accuracy. By using the device, the horizontal extrusion forces of several borehole depths may be monitored by disposing one borehole without mutual interference among monitorings of different pressure measuring segments.

Specifically, the pressure measuring segment 1 includes a main pipe 11, a hydraulic bladder 12, a fixing ring 13, a barrier sheet 14, an outer pillow housing 15 and a connection sleeve 16. As shown in FIGS. 3-9, both ends of the hydraulic bladder 12 are sleeved on the main pipe 11 by the fixing rings 13, and an oil inlet 111 is disposed on the main pipe 11 to be in communication with the hydraulic bladder 12, and a sealing gasket may also be disposed between the fixing ring 13 and the main pipe 11 to ensure sealing of the hydraulic bladder 12. The outer pillow housing 15 is sleeved on the main pipe 11, the connection sleeve 16 is wrapped around an outer side of the outer pillow housing 15, and the barrier sheet 14 is disposed between the fixing ring 13 and the outer pillow housing 15. Under actions of the outer pillow housing 15 and the barrier sheet 14, the hydraulic bladder 12 can only expand along a radial direction of the main pipe, and the connection sleeve 16 ensures that the outer pillow housing 15 can reset smoothly after use. One segment of high-pressure oil pipe 5 may also be fixedly disposed at the oil inlet of the pressure measuring segment 1, and an oil pipe joint may be disposed on the high-pressure oil pipe 5 to facilitate mounting. A threaded segment of the main pipe 11 of the pressure measuring segment is exposed to facilitate rapid connection of the pressure measuring segment and the connecting rod.

Each high-pressure oil pipe 5 is divided into a plurality of segments and the high-pressure oil pipes 5 are connected by oil pipe joints. One segment is connected on the hydraulic pump 3, one segment is disposed in the inner cavities of the push rod 8 and the connecting rod 2, and another segment is disposed in the pressure measuring segment. The pressure control valve 6 and the pressure gauge 4 are also disposed on the high-pressure oil pipe 5 connected on the hydraulic pump 3. The high-pressure oil pipes may be rapidly connected by the oil pipe joints during use. The oil pipe joint is also disposed in the connection casing 9 to facilitate connection of the high-pressure oil pipes. The pressure control valve 6 and the pressure gauge 4 are also disposed on the high-pressure oil pipe 5 to monitor a hydraulic pressure in the pipe, and an oil inlet valve on the pressure control valve 6 is closed after hydraulic oil is pumped by the hydraulic pump. Balancing of the pressure in the hydraulic bladder and the pressure in the pipe is realized by using the high-pressure oil pipe 5 and the pressure control valve 6, so that the pressure gauge on the high-pressure oil pipe 5 can accurately measure the resultant horizontal extrusion force of the borehole at the pressure measuring segment, which more accurately reflects the actual force of the anchor bolt. The pressure gauge 4 may be a digital pressure gauge with a recording function for recording pressure monitoring data in real time, and the hydraulic pump 3 may be a high-pressure pump that can measure the horizontal extrusion force in a larger scope. The high-pressure oil pipe 5 is connected with the oil inlet on the main pipe 11 by the oil pipe joint, internal threads are disposed at inner sides of the pipe walls at both ends of the main pipe 11 respectively to be mated with an external thread of the connecting rod 2, and external threads are disposed at outer sides of the pipe walls at both ends of the main pipe 11 respectively to be mated with internal threads of the barrier sheets 14.

Figure 2:
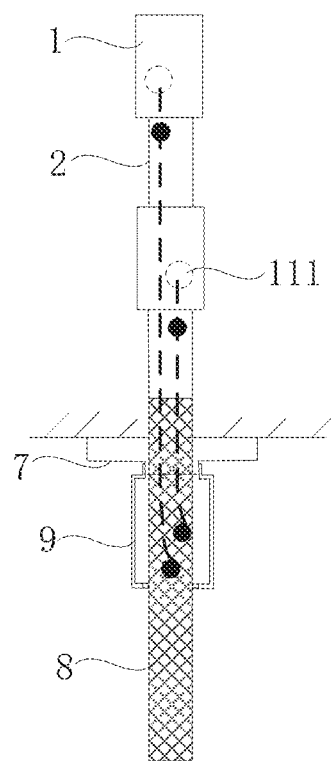
FIG. 2 is a schematic diagram illustrating mounting structures inside and outside a borehole according to an example of the present disclosure.
Figure 3:
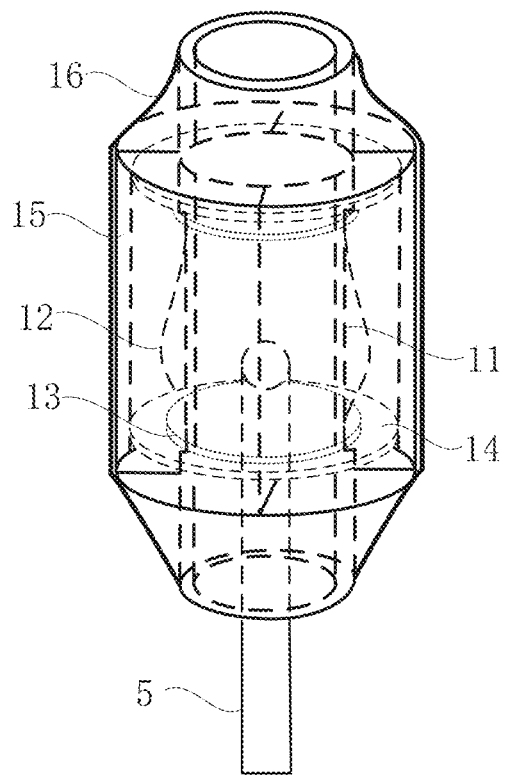
FIG. 3 is a structural schematic diagram illustrating a pressure measuring segment according to an example of the present disclosure.
Figure 4:
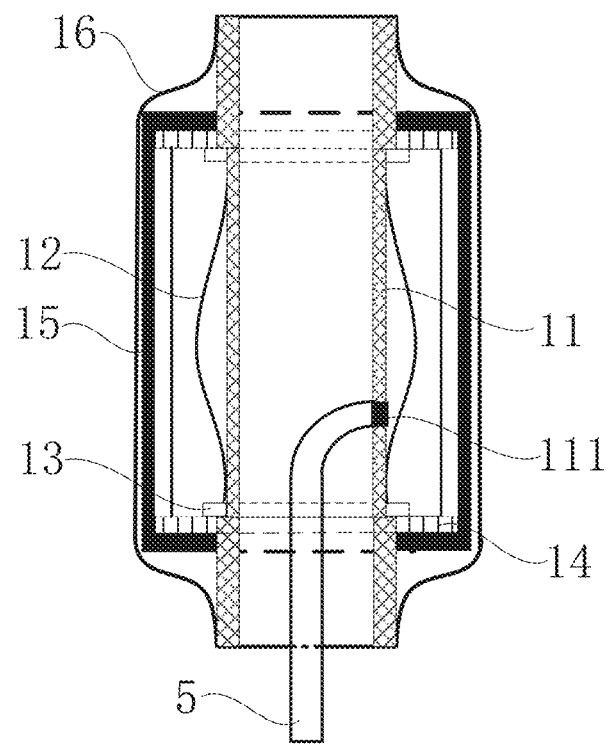
FIG. 4 is a structural schematic diagram illustrating a section of a pressure measuring segment according to an example of the present disclosure.
Figure 5:
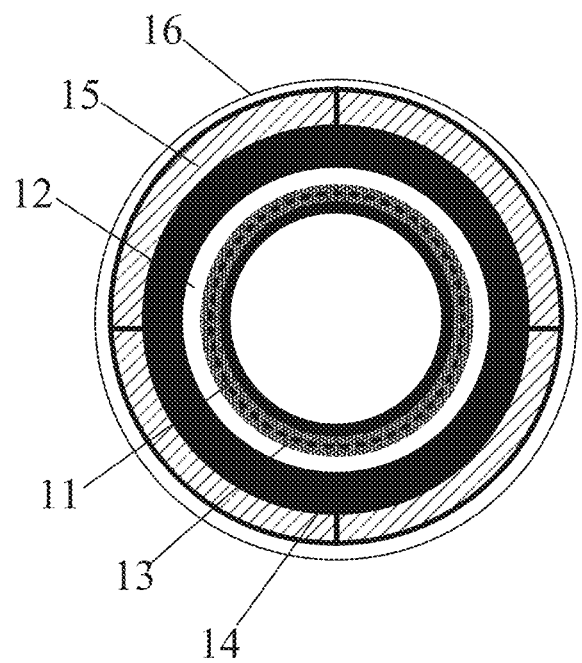
FIG. 5 is a structural schematic diagram illustrating a cross section of a pressure measuring segment according to an example of the present disclosure.
Figure 6:
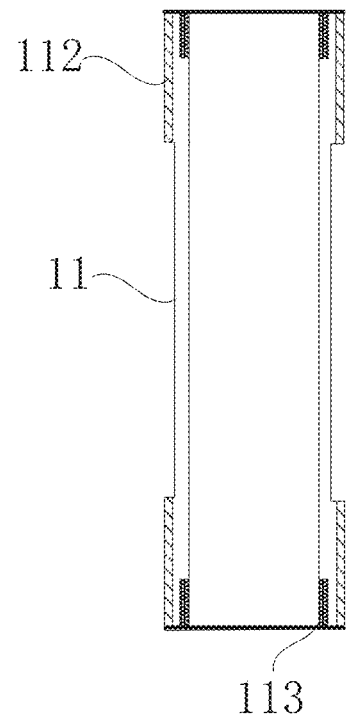
FIG. 6 is a structural schematic diagram illustrating a section of a main pipe according to an example of the present disclosure.
Figure 7:
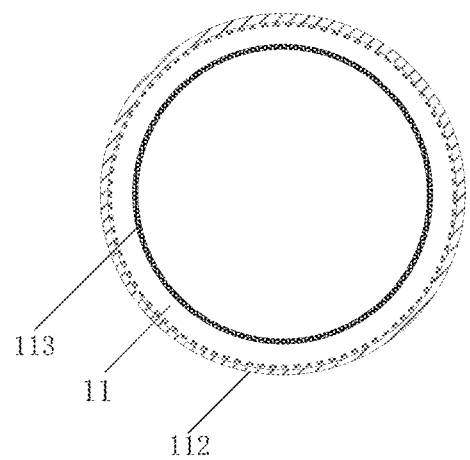
FIG. 7 is a structural schematic diagram illustrating a cross section of a main pipe according to an example of the present disclosure.

As shown in FIG. 2, the connecting rod 2 is connected with two or more pressure measuring segments 1, the number of pressure measuring segments 1 is selected according to the number and the location of points to be monitored, and the connecting rod 2 with an appropriate length is selected according to the location of the point to be monitored. This way, the horizontal extrusion force of the point to be monitored can be measured. One communicating high-pressure oil pipe 5 is disposed for each pressure measuring segment, and the high-pressure oil pipe 5 is connected with the oil inlet on the main pipe 11 to ensure that different pressure measuring segments can perform measurement independently. A design length margin of the high-pressure oil pipe 5 is placed in the connection casing 9 to ensure that monitoring can be performed at a larger depth of borehole.

Figure 8:
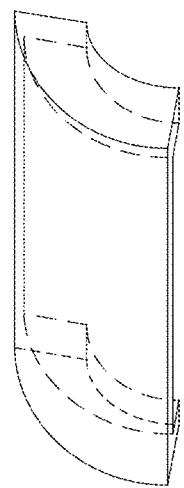
FIG. 8 is a structural schematic diagram illustrating a partial structure of an outer pillow housing according to an example of the present disclosure.
Figure 9:
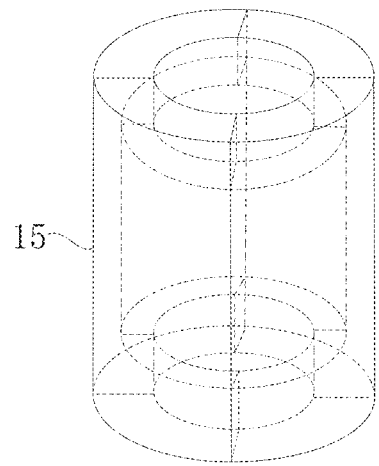
FIG. 9 is a schematic diagram illustrating an overall structure of an outer pillow housing according to an example of the present disclosure.

The outer pillow housing 15 is divided into four or more parts of same shape, and the combination body of the outer pillow housing 15 is a cylindrical housing. As shown in FIG. 8 and FIG. 9, the outer pillow housing 15 is sleeved on the main pipe 11 in a combination manner when the hydraulic bladder 12 contracts and expands in four or more parts when the hydraulic bladder 12 is liquid-filled to expand. After expansion, the outer pillow housing 15 expands outwardly to closely contact with an inner wall of the borehole under the action of the connection sleeve so as to finally keep balance with the horizontal extrusion force in the borehole. At this time, the hydraulic pressure in the hydraulic bladder 12 is equal to the horizontal extrusion force, thereby achieving the measurement purpose. The outer pillow housing 15 and the connection sleeve 16 may also be fixed together through point bonding or fixed connection. Both ends of the connection sleeve 16 are closely attached to the main pipe. When the hydraulic bladder 12 contracts, the connection sleeve 16 tightly presses both ends of the outer pillow housing 15 to be in contact with the main pipe so as to protect the hydraulic bladder 12.

Figure 10:
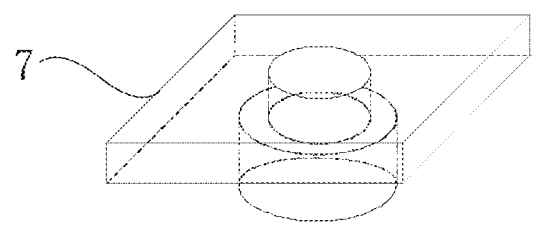
FIG. 10 is a structural schematic diagram illustrating a tray according to an example of the present disclosure.
Figure 11:
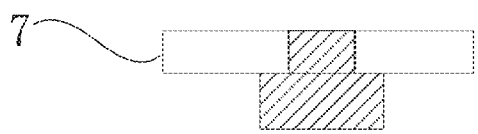
FIG. 11 is a structural schematic diagram illustrating a cross section of a tray according to an example of the present disclosure.

As shown in FIG. 10 and FIG. 11, a through-hole is disposed in the tray 7, a protrusion is also disposed at a lower part of the tray 7, and the connecting rod 2 and the push rod 8 can both pass through the through-hole of the tray. The push rod 8 may be designed as hollow to protect the safety of the high-pressure oil pipe, and an external thread may also be disposed at the outer side of the push rod to facilitate pushing the monitoring device in the borehole deep into the borehole. During mounting, the tray 7 is fixed at the opening of the borehole of the roof, and serves to bear the structure in the borehole after the combination of the pressure measuring segment 1 and the connecting rod 2 protrudes into the borehole. The connection casing 9 is connected with the external thread at the protrusion of the tray 7, and the push rod 8 pushes the connecting rod 2 and the pressure measuring segment 1 by the connection casing 9. The main pipe 11 and the push rod 8 may be made of a steel material to ensure a push strength, and the hydraulic bladder 12 and the connection sleeve 16 may be made of a flexible rubber material to ensure stretchable elasticity and durability of the structure.

A method using the device for monitoring a horizontal extrusion force of roof rock strata, which monitors a change of the horizontal extrusion force along with time. The method includes the following steps.

At step a, the connecting rod 2 with an appropriate length is selected according to the location of the horizontal extrusion force monitoring point and the depth of the borehole, the connecting rod 2 is connected with the pressure measuring segment 1, the high-pressure oil pipes 2 in the inner cavities of the connecting rod 2 and the pressure measuring segment 1 are connected by the oil pipe joint, the tray 7 is fixed, and the connection casing 9 is mounted.

At step b, the push rod 8 pushes the connecting rod 2 and the pressure measuring segment 1 into the borehole; after the tray 7 and the roof are fixed, the pressure measuring segment 1 is mounted, and then the connection casing 9 and the push rod 8 are dismounted by loosening the threads.

At step c, the exposed high-pressure oil pipes 5 are easily connected by the oil pipe joints to the hydraulic pump 3, the pressure control valve 6 and the pressure gauge 4, where the pressure gauge 4 and the pressure control valve 6 are firstly connected, and the hydraulic pump 3 and the pressure control valve 6 are then connected.

At step d, a switch on the pressure control valve 6 is turned on to perform pressurization by injecting oil using the hydraulic pump 3, and the pressurization is stopped after a reading of the pressure gauge 4 reaches 5-6 MPa, so that hydraulic oil flows back; air in the high-pressure oil pipe 5 is emptied as possible by repeating this step 2-5 times.

At step e, the pressurization is performed by injecting oil using the hydraulic pump 3, and after the reading of the pressure gauge 4 reaches 5-6 MPa, the pressure control valve 6 is closed, and then the hydraulic pump 3 is dismounted.

At step f, pressurization is performed for a plurality of pressure measuring segments 1 respectively through hydraulic oil injection by repeating steps d and e, or hydraulic oil is injected for a plurality of pressure measuring segments 1 simultaneously by using a plurality of hydraulic pumps 3.

At step g, after the hydraulic oil is injected into all pressure measuring segments 1, the hydraulic pump 3 is dismounted, and monitoring data of the pressure gauge is monitored and stored; a digital pressure gauge with a data recording function is used to read the monitoring data at a regular interval of time to facilitate monitoring.

At step h, the pressure control valve 6 is opened to discharge the hydraulic oil, and the pressure measuring segment 1 contracts; the connection casing 9 and the push rod 8 are re-connected to take out the connecting rod 2 and the pressure measuring segment 1 from the borehole to facilitate reuse.

Certainly, the above descriptions are not intended to limit the present disclosure, and the present disclosure is also not limited to the above examples. Changes, modifications, additions or substitutions made by persons skilled in the art within the spirit of the present disclosure shall also belong to the scope of protection of the present disclosure.

The invention claimed is:

1. A device for monitoring a horizontal extrusion force of roof rock strata, comprising: a pressure measuring segment, a connecting rod, a hydraulic pump, a pressure gauge, a high-pressure oil pipe, a pressure control valve, a tray, a push rod and a connection casing, wherein the connecting rod is connected with the pressure measuring segment, a front end of the push rod is connected with the connecting rod, a rear end of the push rod passes through the tray, and the connection casing is connected with the tray; the high-pressure oil pipe is connected with the hydraulic pump and protrudes to the pressure measuring segment through inner cavities of the push rod and the connecting rod;

the pressure measuring segment comprises a main pipe, a hydraulic bladder, a fixing ring, a barrier sheet, an outer pillow housing and a connection sleeve; both ends of the hydraulic bladder are sleeved on the main pipe by the fixing rings, and an oil inlet is disposed on the main pipe to be in communication with the hydraulic bladder; the outer pillow housing is sleeved on the main pipe, the connection sleeve is wrapped around an outer side of the outer pillow housing, and the barrier sheet is disposed between the fixing ring and the outer pillow housing.

2. The device according to claim 1, wherein each high-pressure oil pipe is divided into a plurality of segments and the high pressure oil pipes are connected by oil pipe joints, wherein one segment is connected on the hydraulic pump, one segment is disposed in the inner cavities of the push rod and the connecting rod, and another segment is disposed in the pressure measuring segment; the oil pipe joints are disposed in the connection casing; the pressure control valve and the pressure gauge are further disposed on the high-pressure oil pipe connected on the hydraulic pump.

3. The device according to claim 2, wherein two or more pressure measuring segments are connected with the connecting rod, and one communicating high-pressure oil pipe is disposed for each pressure measuring segment; a design length margin of the high-pressure oil pipe is placed in the connection casing.

4. The device according to claim 1, wherein the high-pressure pipe and the oil inlet on the main pipe are connected by the oil pipe joint, internal threads are disposed at inner sides of pipe walls at both ends of the main pipe respectively to be mated with an external thread of the connecting rod, and external threads are disposed at outer sides of pipe walls at both ends of the main pipe respectively to be mated with internal threads of the barrier sheets.

5. The device according to claim 1, wherein the outer pillow housing is divided into four parts of same shape, and the combination body of the outer pillow housing is a cylindrical housing; the outer pillow housing is sleeved on the main pipe in a combination manner when the hydraulic bladder contracts, and expands in four parts when the hydraulic bladder is liquid-filled to expand.

6. The device according to claim 1, wherein both ends of the connection sleeve are closely attached to the main pipe, and the connection sleeve tightly presses both ends of the outer pillow housing to be in contact with the main pipe.

7. The device according to claim 1, wherein a through-hole is disposed on the tray, and the connecting rod passes through the through-hole of the tray; the connection casing is connected with an external thread at a protrusion of the tray; the push rod pushes the connecting rod and the pressure measuring segment by the connection casing.

8. The device according to claim 1, wherein the main pipe and the push rod are made of a steel material, and the hydraulic bladder and the connection sleeve are made of a flexible rubber material; the pressure gauge is a digital pressure gauge; the hydraulic pump is a high-pressure pump.

9. A method using the device for monitoring a horizontal extrusion force of roof rock strata according to claim 1, comprising the following steps:

- at step a, connecting the connecting rod with the pressure measuring segment, connecting the high-pressure oil pipes in the inner cavities of the connecting rod and the pressure measuring segment by the oil pipe joints, fixing the tray, and mounting the connection casing;
- at step b, pushing the connecting rod and the pressure measuring segment into a borehole by the push rod, and dismounting the connection casing and the push rod after the tray and the roof are fixed;
- at step c, connecting the exposed high-pressure oil pipes to the hydraulic pump, the pressure control valve and the pressure gauge;
- at step d, turning on a switch on the pressure control valve, performing pressurization by injecting oil using the hydraulic pump, and stopping pressurization after a reading of the pressure gauge reaches 5-6 MPa, so that hydraulic oil flows back; emptying air in the high-pressure oil pipe by repeating this step 2-5 times;
- at step e, performing pressurization by injecting oil using the hydraulic pump, and closing the pressure control valve after the reading of the pressure gauge reaches 5-6 MPa;
- at step f, performing pressurization for a plurality of pressure measuring segments respectively through hydraulic oil injection by repeating steps d and e;
- at step g, dismounting the hydraulic pump, and monitoring and storing monitoring data of the pressure gauge; and
- at step h, opening the pressure control valve to discharge the hydraulic oil; connecting the connection casing and the push rod to take out the connecting rod and the pressure measuring segment from the borehole by the connected push rod.

* * * * *